O. SELG & C. GUNTRUM.
APPARATUS FOR SEPARATING AND WASHING YEAST.
APPLICATION FILED NOV. 11, 1908.
918,096.
Patented Apr. 13, 1909.
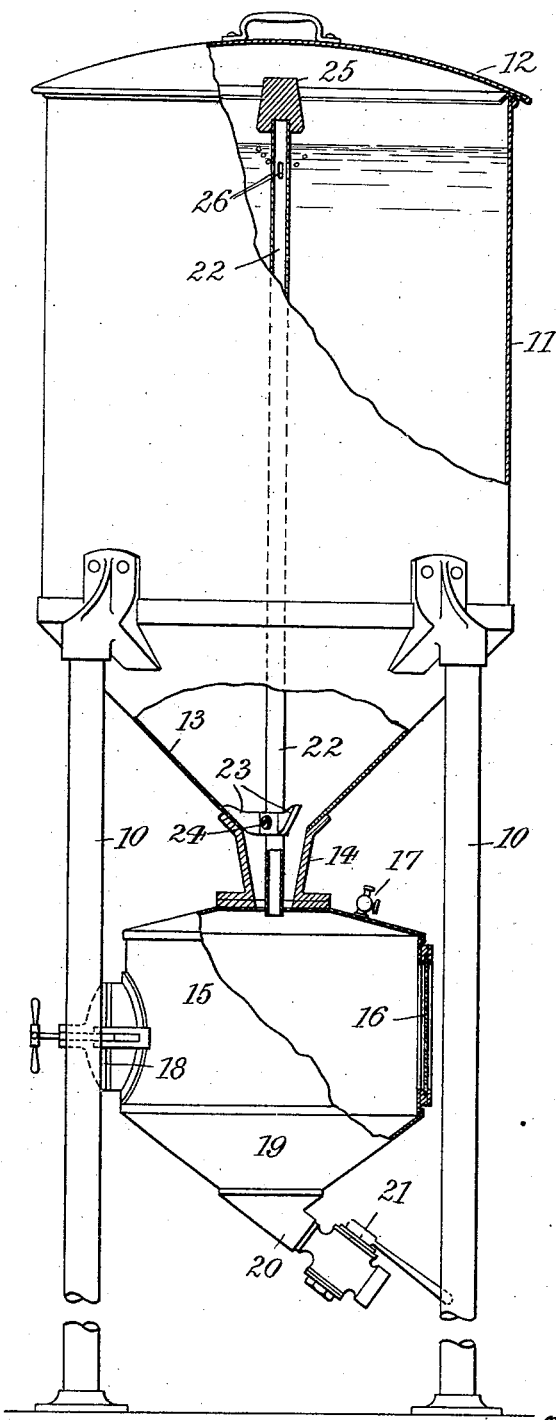

UNITED STATES PATENT OFFICE.

OTTO SELG AND CARL GUNTRUM, OF NEW YORK, N. Y., ASSIGNORS TO THE SELG BREWERY APPARATUS CO., OF NEW YORK, N. Y., A CORPORATION OF NEW YORK.

APPARATUS FOR SEPARATING AND WASHING YEAST.

No. 918,096.  Specification of Letters Patent.  Patented April 13, 1909.

Application filed November 11, 1908. Serial No. 462,004.

*To all whom it may concern:*

Be it known that we, OTTO SELG and CARL GUNTRUM, both citizens of the United States, and residents, respectively, of New York city, Manhattan, county and State of New York, and New York city, Brooklyn, county of Kings, State of New York, have invented new and useful Improvements in Apparatus for Separating and Washing Yeast, of which the following is a specification.

This invention relates to improved means for washing yeast and separating the lighter particles and impure matter from the pure heavy particles in a quick, simple and efficient manner.

The accompanying drawing is a side elevation, partly in section, of an apparatus embodying our invention.

Upon posts 10 is supported an elevated tank of copper 11 having a removable cover 12. The apertured bottom 13 of the tank is tapering and merges into a tapering neck 14. This neck communicates with the top of a vessel or pocket 15 arranged below tank 11 and having observation glass 16, pet cock 17 and hand-hole cover 18. Into tapering bottom 19 of vessel 15, opens a nozzle 20 controlled by valve 21.

Through tank 11 extends axially a removable and reversible pipe 22 which passes through neck 14 so as to leave an open space around said pipe within said neck and terminates at its lower end about flush with the top of vessel 15. Pipe 22 is embraced by a spider 23 resting upon bottom 13 and adjustably secured to pipe 22 by a clamp screw 24, so that the elevation of the pipe may be adjusted. At one end, (shown to be the lower end, in the drawing), pipe 22 is open, while at its other end it carries a plug 25, and is provided with lateral discharge orifices 26 some distance below said plug.

The operation is as follows: Pipe 22 being entirely removed, water is, through nozzle 20, forced into vessel 15 from which it will rise, through neck 14, into tank 11. When the tank is partly filled, the yeast to be purified is thrown into tank 11 through open cover 12 and the inflow of water is continued until the tank is about filled, so that a thorough mixture is obtained. The water is then shut off, pipe 22 is inserted into tank 11 with its open end downward, and cover 12 is closed. In this position the discharge orifices 26 will be below the liquid level in tank 11, while plug 25 will be above such level. The pure yeast, being of greater specific gravity than water, will descend and pass along tapering bottom 13 through neck 14 into vessel 15. The water within said pocket, which is thus displaced, will rise through pipe 22 and will be discharged through orifices 26 near the top of tank 11 and below the liquid level thereof, to effect a circulation. The bulk of the lighter particles of yeast and impurities will remain suspended in the liquid within tank 11, while some of such matter will be carried into pocket 15 and will be returned to the tank through pipe 22. After the purifying process has been carried on for a sufficient length of time, say about half an hour, all the pure yeast will have settled in pocket 15, while, substantially, all the water will be displaced therefrom. Cover 12 is now opened and pipe 22 is reversed, so as to close neck 14 by plug 25. The pure yeast is withdrawn through nozzle 20, and then pipe 22 is removed to open neck 14 and thus effect the separate discharge of the impurities and lighter particles from tank 11 through said nozzle.

We claim:

1. An apparatus for separating and washing yeast, comprising an upper tank having a neck, a lower vessel communicating with the neck, a loosely supported pipe which is open near the top and at the bottom and extends through the vessel into the neck, said pipe being of a diameter to leave a surrounding open space within the neck, and means for closing the neck.

2. An apparatus for separating and washing yeast, comprising a tank having a neck, a vessel communicating with said neck, a removable and reversible pipe opening into said vessel through said neck and of a diameter to leave an open space around the pipe within the neck, a plug on one end of said pipe, and lateral discharge orifices in the pipe below said plug.

Signed by us at New York city (Manhattan) N. Y. this 9th day of November 1908.

OTTO SELG.
CARL GUNTRUM.

Witnesses:
FRANK V. BRIESEN,
W. R. SCHULZ.